US006873876B1

(12) United States Patent
Aisa (10) Patent No.: US 6,873,876 B1
(45) Date of Patent: Mar. 29, 2005

(54) SYSTEM FOR PROGRAMMING A HOUSEHOLD APPLIANCE HAVING AN ELECTRONIC CONTROL

(75) Inventor: Valerio Aisa, Fabriano (IT)

(73) Assignee: Wrap SpA, Fabriano (IT)

( * ) Notice: Subject to any disclaimer, the term of this patent is extended or adjusted under 35 U.S.C. 154(b) by 0 days.

(21) Appl. No.: 09/868,020

(22) PCT Filed: Sep. 29, 1999

(86) PCT No.: PCT/IB99/01593

§ 371 (c)(1),
(2), (4) Date: Jun. 12, 2001

(87) PCT Pub. No.: WO00/19284

PCT Pub. Date: Apr. 6, 2000

(30) Foreign Application Priority Data

Sep. 30, 1998 (IT) ........................ TO98A0822

(51) Int. Cl.$^7$ .............................................. G05B 19/42
(52) U.S. Cl. ........................... 700/86; 700/83; 700/87; 219/720; 219/728; 219/745; 219/492; 219/506
(58) Field of Search ................................ 219/490, 492, 219/506, 544, 702, 714, 720, 728, 745, 739, 735, 748; 700/83, 86, 87; 361/681, 683; 340/3.51; 432/32

(56) References Cited

U.S. PATENT DOCUMENTS

| | | | | | |
|---|---|---|---|---|---|
| 4,968,864 | A | * | 11/1990 | Doi et al. | 219/714 |
| 4,998,292 | A | * | 3/1991 | Eigeldinger et al. | 455/186.1 |
| 5,274,209 | A | * | 12/1993 | Edamura | 219/714 |
| 5,565,855 | A | * | 10/1996 | Knibbe | 340/3.51 |
| 5,647,231 | A | * | 7/1997 | Payne et al. | 68/12.01 |
| 5,841,119 | A | * | 11/1998 | Rouyrre et al. | 235/380 |
| 5,844,796 | A | * | 12/1998 | Araki | 700/86 |
| 5,967,021 | A | * | 10/1999 | Yung | 99/327 |
| 6,275,922 | B1 | * | 8/2001 | Bertsch | 712/36 |

FOREIGN PATENT DOCUMENTS

| | | | | |
|---|---|---|---|---|
| EP | 0391316 A1 | | 10/1990 | ........... G05B/19/04 |
| EP | 0588107 A1 | | 3/1994 | ........... G05D/23/19 |
| EP | 0649933 A1 | | 4/1995 | ........... D06F/39/00 |
| EP | 684692 A2 | * | 11/1995 | ........... H02P/7/00 |
| EP | 0684692 A2 | | 11/1995 | ........... H02P/7/00 |
| WO | WO 9702573 A1 | * | 1/1997 | ........... G11C/16/06 |

* cited by examiner

*Primary Examiner*—Anthony Knight
*Assistant Examiner*—Crystal J Barnes
(74) *Attorney, Agent, or Firm*—Cesari and McKenna, LLP

(57) ABSTRACT

A system is described for programming a household appliance that has electronic control means for executing a plurality of control programs. The household appliance operates in accordance with conventional functions, able to perform standard programs, and has the feature of being prearranged for receiving and retaining additional operating programs, coming from outside, according to the user's specific requirements; such new programs are designed and stored in the control system of the household appliance through an external electronic device, such as a Personal Computer programmed accordingly. The control system of the household appliance comprises a duly prearranged microcontroller, associated with suitable memory means and means for interfacing with said external electronic device; a protected part, i.e. non-modifiable, of the memory means contains the information required for executing the basic programs, whereas a freely modifiable part of the memory means is assigned for the storage of the new additional programs.

45 Claims, 3 Drawing Sheets

Fig. 4

SYSTEM FOR PROGRAMMING A HOUSEHOLD APPLIANCE HAVING AN ELECTRONIC CONTROL

DESCRIPTION

The present invention relates to a system for programming a household appliance having an electronic control, of the type being able to execute a plurality of programs.

As known, a program consists of a set of instructions duly encoded for controlling the execution of operating cycles, which are meant as a group of operations for handling the items submitted to the action of the household appliance; each operating cycle is individually split in handling steps of its own, which are more or less complex, each one of them featured by specific parameters, which are substantially related to times and modes of actuation of specific internal devices of the household appliance (think for instance, for the case of a laundry wash machine, to solenoid valves, motors, heaters, pumps, fans, detergent dispensers, etc.); in some cases, one same program is apt for controlling execution of several sequential operating cycles (think for instance, always in the case of a laundry washing machine, to a wash cycle followed by a drying cycle).

From the above, it appears clear that quite different handling cycles and consequently in various programs corresponds to different values of the parameters mentioned above.

As known, household appliances usually provide a certain number of operating programs, which can be selected by the user according to his/her own requirements.

In general, such programs have a substantially rigid structure, which mainly depends upon the experience and capacity acquired in time by the appliance manufacturer, and a minimum degree of discretional power is left to the user of the appliance in modifying such a structure.

Let us think, for instance, to washing machines which usually have a certain number of standard programs, where only few modifications with the aid of proper control means, such as selectors, push-buttons, etc., can be made by the user, such as setting the washing temperature: the same applies for setting the cooking temperature in household cooking ovens.

However, in daily practice, it may happen that such limited capabilities of modifying an operating program of the household appliance does not comply with the user's requirements; moreover, the user has no way to permanently store the various modifications he is frequently making manually to a certain program, so that each time he is forced to make a complete resetting.

Household cooking ovens represent a characteristic example of the rigidity of the basic or standard programs of most household appliances presently available.

According to the known technique, in fact, in the instance of household cooking ovens neither the simple programming of different temperature profiles within one operating cycle, nor the control of the activation and/or deactivation at preset times of heat sources or ventilation devices or their alternation and/or modification during the program execution are allowed.

As a result, in the instance of complex cooking processes, a household cooking oven presumes the user's presence and his personal manual activity, right in view of modifying the configuration of the heat sources or the temperature profiles in the time: the user has indeed the opportunity of making such modifications manually, but this obviously requires a high engagement and is complicated.

Let us think, for instance, of baking a roast-beef in an oven, which requires in general an initial phase with a considerable heat supply followed then by a low fire phase.

The preparation of such a simple dish in a conventional oven does necessarily require the user's presence, for manually changing, at the right time, the temperature and/or the configuration of the heating elements, after the oven has performed the above initial phase.

Obviously, similar problems also arise in household appliances other than cooking ovens, such as laundry washing machines, dishwashers, refrigerators and in general for any household appliance where a user may wish to obtain specific ad-hoc programs, to suit his own requirements.

In an attempt of facilitating from a practical viewpoint the programming of complex functions, household appliances have been proposed, having an electronic control and proper dialog means, such as displays and keyboards, with the purpose of reducing the user's difficulties through a most interactive programming.

However, such solutions do not allow for generating real new permanent operating programs, being designed by the user; moreover, said dialog means, which are rather expensive, require the use of electric/electronic devices capable of withstanding the difficult working conditions of the household appliance, leading to a consequent increase in the cost of the latter.

Other solutions are also known, which provide for the use, on-board the household appliance, of sophisticated systems for further programming, based on bar-code readers or magnetic cards; such systems ease the user's life on one hand, and increase the final cost of the appliance to a prohibitive extent on the other hand; moreover, the programs configured as bar codes or magnetic cards may not fully comply with the user's specific requirements.

As it can be noticed, therefore, the household appliances of the above type, though being characterized by a high sophistication level, have an extremely high cost, which tends to limit their diffusion and make them less "user friendly".

Appliances for beverage preparation are also known in an industrial environment, whose electronic control system can be interfaced to an external device, such as a computer; in this instance, the appliance provides a limited number of standard operative programs having a well defined structure, while the external device is used, when installing the appliance itself, to set some characteristic parameters of said predefined standard programs according to the user's instructions and/or type of beverage to be prepared; the parameters are then permanently stored in the memory means of the appliance control system, until a new setting of such parameters is necessary.

The above system, which is provided for the initial setup or the periodical setting of the appliance, has the drawback of not allowing a real creation of new operative programs, other than the standard ones, to suit the user's necessities.

Apart form the fact that an industrial appliance for beverage preparation represents a more complex and expensive machine compared to a common household appliance, a solution of the above kind, when referred to a household appliance, would not solve the above problems, save allowing for a durable saving of the parameters most frequently used with reference to the basic programs alone.

Another drawback of the above solution is the limited number of available programs, without any capability of adding new programs to the existing ones.

From EP 0 588 107 A1 and EP 0 391 316 A1 systems are known for programming in different ways a basic household appliance, during the manufacturing stage of the latter; in this way, it is thus possible to produce several models of the same appliance, the operating programs of which differ depending upon its market destination.

According to this solutions, the basic household appliance is provided with a control system comprising a microcontroller, memory means, means for interfacing the control system to an external programming device and a control panel, residing on the appliance.

During the manufacturing stage, an external electronic programming device is connected to the control system, for storing within the memory means all the operating programs being specifically intended for the appliance model under production; said programs are then selectable through the control panel, for allowing the immediate use of the appliance, once the latter has been marketed.

It is the object of the present invention to indicate a solution for the above problems, without increasing the cost of the household appliance to a prohibitive extent.

Within this frame, the present invention has the aim of providing a system for programming a household appliance having standardized operating programs, which allows for improving, the control system of the appliance itself through the addition, in the time and under specific user's necessities, of durable programs which are designed according to the users specific requirements.

Said aim is obtained according to the present invention by a system and a method for programming a household appliance having the characterizing features of the annexed claims; said aim is also attained by a household appliance, for the use in the system, and by a programming user interface, for the use in the method.

Further embodiments of the system, the method, the appliance and the user interface according to the present invention are then described in the attached dependents claims, which form an integral part of the present description.

Further aims, features and advantages of the present invention will become apparent from the following detailed description and annexed drawings, which are supplied by way of non limiting example, wherein.

As mentioned above, the idea at the basis of the present invention is to provide a household appliance having conventional functions, i.e. equipped with common basic programs, which has, however, the peculiar feature of being already prearranged for receiving and retaining new operating programs, which come from outside an are designed according to specific user's requirements; according to the invention, the new operating cycles of the appliance, and therefore the new programs, are designed and stored in the appliance control system through an external electronic device being programmed to this purpose.

According to the invention, the appliance control system is at least partially of the electronic type and comprises a duly prearranged microcontroller, to which suitable memory means are associated; a protected part (i.e. which cannot be modified) of the memory means contains the information required for executing the basic or standard operating cycles of the household appliance, whereas a free modifiable part of the memory means is provided for storing new operating cycles which originates the new programs.

The control system can be interfaced with said external electronic device, which has the aim of allowing the user to create and insert in a simplified mode, within the above said memory means, new operating cycles of the household appliance which originate the new programs; to this purpose, the appliance control system provides for a proper interfacing module, preferably being and of a low cost, which forms an optional component of the appliance itself.

On the other hand, the control panel of the household appliance according to the invention has a common appearance and a low cost, and therefore equipped with usual knobs, push-buttons and at least a simplified display device, so that the user may easily use the basic functions and operating cycles of the appliance; according to the invention, said control means are then also used for selecting new operating cycles once they are stored in the appliance control system and they have originated the new programs.

Figure 1:
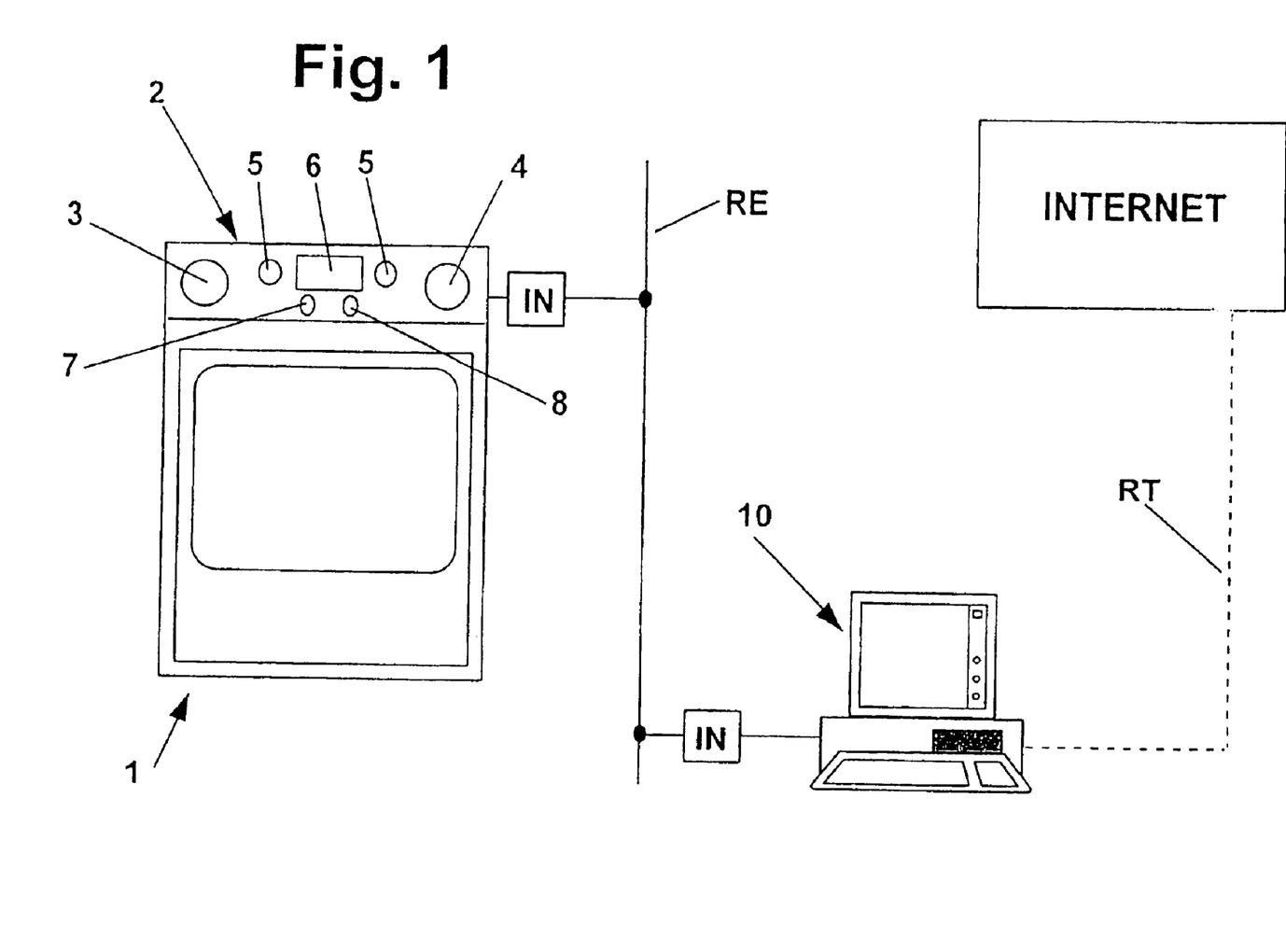
FIG. 1 shows schematically a system for programming a household appliance having an electronic control according to the present invention.

In FIG. 1, reference 1 indicates schematically a household appliance according to the present invention, which in the give example is a cooking oven.

The oven 1 has a panel 2 containing control and display means, which comprise in particular:
  a switch 3, for switching the oven on;
  a selector 4, for the possible manual setting of the internal temperature of the cooking chamber of the oven;
  a pair of keys 5 (forward-backward), for selecting an operating program of the oven;
  a display 6, for the identification, in a numerical and/or alphabetical and/or graphical way, of the operating programs being available on the oven, and other possible useful information (such as time, fault alarm messages, etc.).
  a key 7, for starting and/or stopping the program selected through buttons 5 and display 6;
  a key 8, for enabling the programming and/or the displaying of the time on the display 6.

Figures 2, 3:
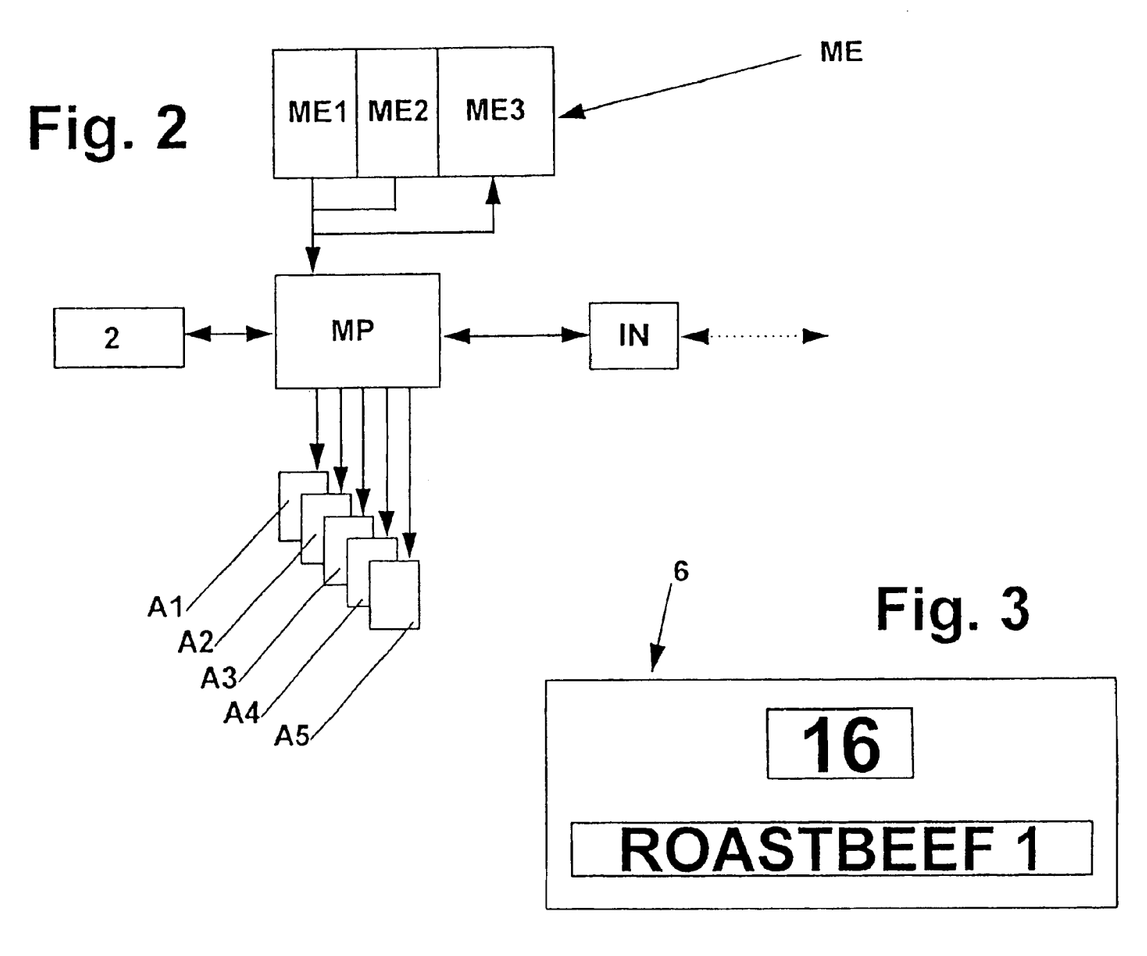
FIG. 2 shows schematically a possible embodiment of the control system of a household appliance according to the present invention.
FIG. 3 shows schematically a display device of a household appliance used in the system according to the present invention.

The oven 1 has an electronic control system, whose structure is shown schematically in FIG. 2. Such a control system comprises an electronic microcontroller MP, being able to interpret the controls inputted through the panel 2 and consequently manage the operation of the oven 1.

Memory means ME are associated to the microcontroller, at least a part of which is of the electrically writable and erasable type; at least three different memory areas can be identified in the memory means ME of FIG. 2.

In a first area ME1 of the memory means ME, information reside permanently, which relate to the general structure of the operating cycles of the oven 1, and the logic which governs their execution, or, in other words, the control program of the oven itself and the data relating to the operating cycles which the appliance can perform, consisting in their turn of phases which are characterized by determined operating parameters relating to the internal devices of the appliance.

Just by way of example, in the instance of the oven 1, for an operative cycle a subdivision can be provided into an initial preheating phase, followed by three or more cooking phases (in the instance of a laundry washing machine, the program may be split in a prewash cycle, a wash cycle, a rinsing cycle, a spinning and/or drying cycle, each cycle comprising one or more phases).

The memory area ME1 is protected, in the sense that the information contained therein cannot be modified by the user; to this purpose, the memory area ME1 preferably consists of a portion of the program memory of the microcontroller MP.

A second area ME2 of the memory means ME is provided for storing the above cited operating parameters characterizing the various phases into which some specific standard operative cycles of the household appliance are subdivided; in other terms, the groups of parameters being stored in the area ME2 relate to standard operative cycles, and therefore to the basic programs, available on the appliance at the time of its purchase, and which allow its immediate use.

Such basic programs are those normally executed by a conventional household appliance; therefore, in the instance of an oven apt for the conventional infrared cooking, reference is made to the capability of selecting the cooking program through the controls on the panel 2, choosing a relevant temperature and eventually a cooking time.

Also the memory area ME2 is protected, in the sense that its contents cannot be modified by the user; this is due to the consideration that the parameters stored therein refer to, the basic functions of the household appliance. Consequently, also the memory area ME2 may consist of a portion of the program memory of the microcontroller MP, or be constituted by a memory of the ROM type.

A name is associated to each group of operating parameters stored in ME2, relating to a determined operating cycle, which is preferably expressed in alphabetic and/or numerical and/or graphical characters, allowing for a univocal identification of a determined program of the appliance. Therefore, the basic programs available can be sequentially scrolled on the display 6, by using the keys 5, in order to select the desired one; preferably, the identifying sign of each program (which is substantially associated to the group of operating parameters characterizing each execution phase of that cooking program) consists of numerical information (program order number) and alphabetic or alphanumerical information (real program name, consisting of a determined number of alphabetic and/or numerical characters describing its function, such as "Static Cooking", "Ventilated Cooking", "Dual Grill", etc.); on the other hand, nothing hinders the use of a proper graphical symbol as an identifying sign for each program, such as an "icon", eventually associated to a name expressed in alphabetic or alphanumerical characters.

FIG. 3 shows by way of example a possible embodiment of the display 6, such as of the liquid crystals type, and of the information represented on it; in the upper portion of the display 6 the program number is represented, whereas the lower portion is used for displaying the assigned name, through alphanumerical characters; for example, the upper and lower portion of the display 6 could allow at least a display of five and fourteen alphanumerical characters, respectively.

In the instance of an oven, the parameters contained in the memory area ME2 may concern the phase duration, the temperature inside the cooking chamber, the configuration of the heating elements, the availability or not of ventilation and the mode of operation which the relevant oven actuators (which just manage the heating elements and the fans) must follow during that phase.

Such actuators, which are controlled by the microcontroller MP in function of the selected program and may consist for instance of relays and/or triacs, can be identified in FIG. 2 til with the relevant devices (heating elements and fans) managed by them, which are shown schematically with A1, A2, A3, A4 and A5. Practically, such devices may consists of a heater underneath the cooking chamber, a heater behind the cooking chamber, a grill heater inside the cooking chamber, a steam generator, an air circulation fan (in the instance of a washing machine the devices may consist of one or more water heaters, a motor for agitating the drum with determined frequencies, directions and speeds, a heater and/or drying fan, a detergent dispenser, a water level control pressure switch, etc.); obviously, the control system comprises suitable sensor means of the operating conditions of the oven 1 (such as a temperature sensor), not shown in the figures for simplicity's sake.

Finally, a third area ME3 of the memory means ME is provided for receiving the parameters characterizing the various phases into which additional operative cycles of the household appliance are subdivided, which are generated and/or stored therein on user's request, through an electronic device which can be interfaced with the oven 1, and which therefore determines new programs.

Unlike the areas ME1 and ME2, the contents of the memory area ME3 are freely writable, erasable and modifiable according to the user's requirements; to this purpose, the memory area ME1 preferably consists of an electrically writable and erasable memory, in particular a memory of the EEPROM type.

Obviously, also in this instance, each group of parameters relating to the phases of a specific cycle eventually stored in the area ME3 has an associated name and/or order number and/or graphic sign, for allowing the univocal identification of the relevant program, as previously described with reference to the contents of the memory area ME2 (for example, "Roastbeef", "Pizza", "Lamb", etc.).

Obviously, the identifying information of each program and therefore of the relevant operating cycle (for a basic program or a new program), are stored in the memory means ME2 or ME3, respectively.

Then, in other terms, according to the present invention, the oven 1 has initially a sort of "intelligence" residing in the memory areas ME1 and ME2, for obtaining a certain number of basic or standard programs (for example seven); the user has then the opportunity of adding in time the information relating to new programs generated according to the user's specific requirements or wishes, and storing them in the memory area ME3.

By way of example, the memory area ME3 may be provided for containing the parameters characterizing other thirty-three additional programs (or even more, depending on the size chosen for the memory ME3), which can be inserted in the control system of the household appliance through an external electronic device.

To this purpose, the control system of the oven 1 has a proper interface IN (FIG. 1) of a known type, through which the microcontroller is able to communicate with the external world; in the application according to the present invention, any microcontroller MP having an asynchronous serial line can be suitable, so that the interfacing means m may consist of a simple standard serial port (type EIA-RS232); this solution obviously, allow for interfacing the control system of the oven 1 directly to a Personal Computer, which therefore would represent the above external electronic device, required for generating/storing the new programs of the household appliance.

In a more sophisticated technically embodiment, but surely more practical for the user, the interface IN may consist of an adapter, in itself known, which allows for connecting the control system of the oven 1 to a "home bus", which uses for instance the same electric mains as the means for the bi-directional data transmission (power line carrier), in conformity with the transmission rules being associated to a specific protocol, such as LonWorks of Echelon (USA), or EHS (European Home System), or CEBus (USA), or EIB (Siemens), etc.

Back to FIG. 1, the case is there represented of interfacing the control system of the oven 1 to a generic power line carrier bus, by means of an adapter IN, where the home electric network RE is used as a transmission means.

Always in FIG. 1, a Personal Computer indicated with 10 is equipped with a similar adapter IN for its interfacing to the electric network RE; thus, the control system of the oven 1 and the Personal Computer, duly programmed to this purpose, are able to intercommunicate.

To this purpose, according to the present invention, on the Personal Computer 10 a special managing software is present, called "editor" in the following, which provides for at least the following functions:

possibility of reading, from the memory ME, the operating parameters characterizing; the various phases of the operating cycle (or the operating cycles) relating to each basic program of the oven 1, but with no possibility of modifying the contents of the memory area ME2 of the appliance control system; the selection of the parameters to be read by the Personal Computer 10 is based on an identifying code assigned to the program;

possibility of modifying the above parameters characterizing the basic programs of the oven 1; however, only the new values can only be saved in the memory area ME3, by pairing them with an identifying code being different from that assigned to the original basic program residing in the memory area ME2;

possibility of editing new cooking programs, i.e. characterized by different values for the operating parameters of the various phases of the operating cycle, even being entirely different from the ones already contained of the memory area ME2 (and eventually also ME3), and of storing them in the memory area ME3 with a new identifying code (obviously, nothing hinders the user from generating such new programs starting from the programs already possibly contained in ME3).

Preferably, the editor according to the present invention will be supplied free of charge or at a minimum cost for the user purchasing the household appliance, on a suitable magnetic or optical carrier (Floppy Disk or CD ROM) or through telecom network (for example, Internet).

Therefore, as it will be appreciated, in this the possibility is offered of generating real and new operating programs for the household appliance, which may be designed by user according to his specific requirements or habits and saved permanently in the control system of the appliance, where they may be retained for an unlimited time or until a likely subsequent modification or cancellation by the user takes place.

Concerning the specific function of generating new programs, the editor provided according to the present invention allows for selecting, within the frame of each phase of an operating cycle, the relevant characteristic parameters, which in the instance of the oven 1 may refer, as said, to the phase duration, the desired temperature in the cooking chamber, the type of ventilation (if desired), the type of heat sources to be used and their activation modes. Obviously, these are just a few examples relating to an oven, and in no ways limiting examples.

Figure 4:
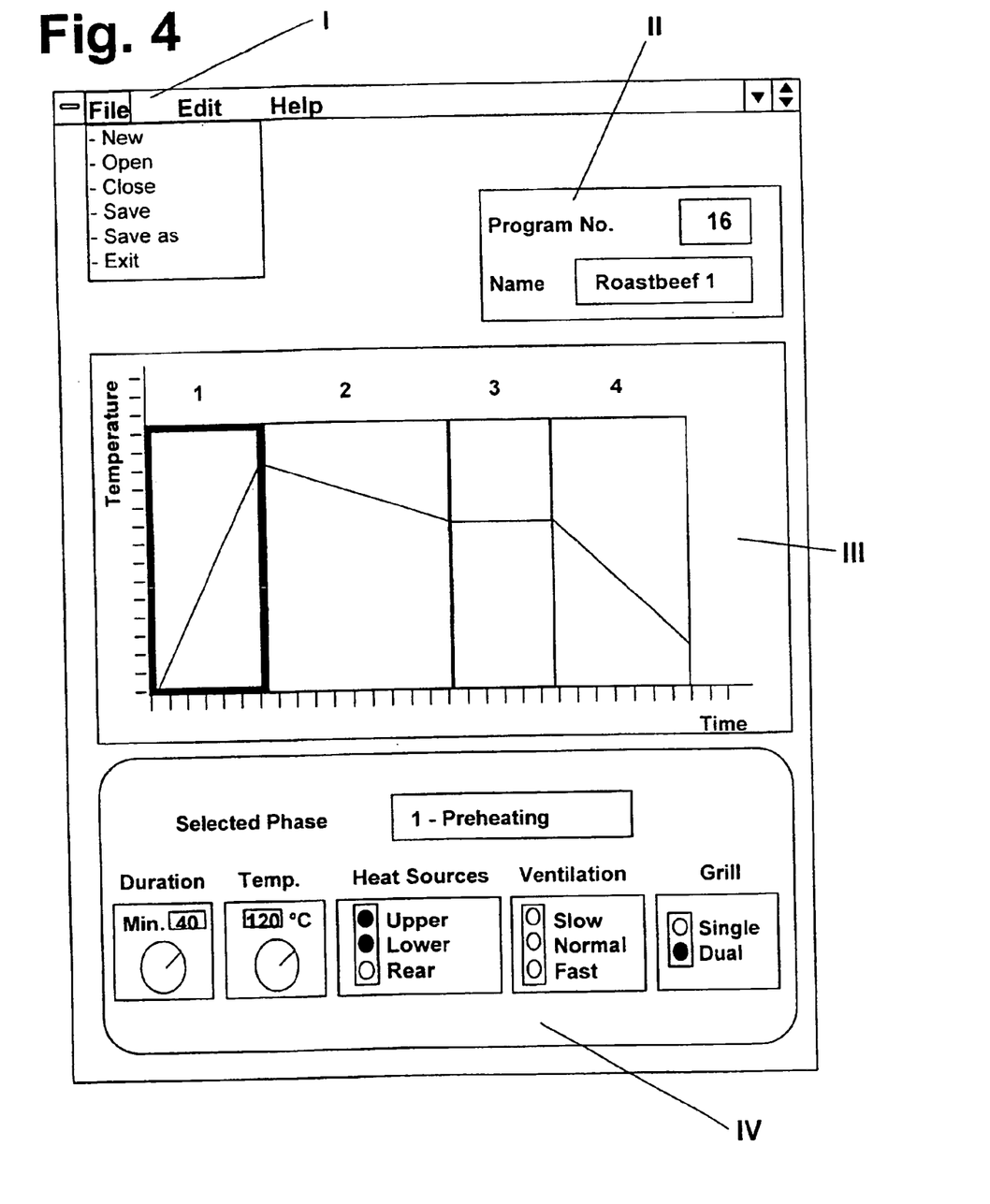
FIG. 4 shows schematically an example of a video display of a managing program or editor, used in the system according to the present invention.

The above parameters are displayed on the video of the Personal Computer, preferably in a graphic mode as schematically represented in FIG. 4, where a possible video display of the editor is shown by way of example.

Four zones can be substantially identified in this figure, for the displaying and inputting of data, and precisely:

a first zone indicated with I, being dedicated to the selection of various editor options;

a second zone indicated with II, identifying the appliance program being currently displayed/edited;

a third zone indicated with III, being dedicated to the selection of the phase of interest out of the phases into which the relevant operating cycle of the appliance is subdivided, and to the displaying of some parameters relating to such phases;

a fourth zone indicated with IV, being dedicated to the complete displaying and modification of the parameters of the phase (selected in the zone 111) of the program (identified in the zone II).

As it can be seen, the zone 1 consists of a tool bar, such as typically used in a Windows® environment and therefore having "scroll down" menus. In the example being represented in the figure, the menus "File", "Edit" and "Help" are provided. In particular, by means' of the menu "File", which is highlighted, options may be selected, such as:

creating a new program for the oven 1 (option "New");

opening an existing program (option "Open"), residing in the memory area ME2 or ME3 of the control system of the oven 1 (or eventually in the memory of the Personal Computer 10);

closing the program being currently on displaying or editing program, without saving it (option "Close");

saving the edited or modified program (option "Save"), to which a name is already associated to; such an option, as explained above, allows for saving a program only in the memory area ME3 or in the memory of the Personal Computer;

saving the edited or modified program., by assigning to it a name being different from the original one (option "Save as");

exiting the editor (option "Exit").

The zone II is instead destined to identify the program being displayed/edited on the editor, by means of the indication of its assigned number and the relevant alphanumerical name; in the specific instance shown in the figure, the program of interest is identified by the number "16" and the name "Roastbeef 1", respectively.

In the zone III the graphic representation is provided, on a Cartesian plane, of the various phases forming the, operating cycle controlled by the program in course of display/editing, where the duration of the various phases (and then, globally, the duration of the entire cycle) is on the abscissa, and the temperature value of the cooking chamber of the oven 1, to be reached and maintained during such phases, is on the ordinate.

Thus, the graph globally points out a curve being representative of the progress of ihe temperature during the entire operating cycle, or, in other words, the thermal profile of the cooking cycle.

In the above example, the cycle provides for four phases, being represented by the four rectangles marked 1, 2, 3, 4 (the information concerning the splitting of the operating cycle into the four steps pertains, as previously mentioned, to the contents of the memory area ME1).

For the selection of the phase to be modified, the computer keyboard can be used directly., or more simply positioning the pointer of a mouse in correspondence of the rectangle of interest, and clicking there.

In the case of FIG. 4, the phase I has been selected, i.e., the first rectangle from the left; this selection is highlighted by means of a thicker perimetric line of the rectangle.

Finally, the zone IV is used for the displaying and the possible modification of the n, 15 parameters for the selected phase of the operating cycle.

In the example of FIG. 4, therefore, the zone IV represents the various parameters characterizing the step I, previously selected in the zone III.

This zone IV reports in its upper portion the indication of the selected phase (1-Preheating) and in the lower portion the "tools" for selecting and modifying the various parameters.

As it can be noticed in the figure, such parameters and the relevant instruments concern (from left to right):

the phase time, which can be set by means of the mouse (rotating the symbol of an index selector), or directly through the keyboard (through specific keys, or placing the mouse pointer in a special field and inputting the requested value); this corresponds in a real time, in the zone III, to a change of the width of the corresponding rectangle; in the example, a duration of 40 minutes has been selected for the phase 1;

the phase temperature, which can be set with in the same ways as for the above phase time; consequently, in the zone III and in real time, a modification in the ordinate value of the segment of the temperature curve and of the relevant inclination within the corresponding rectangle will take place; in the example, a temperature of 120 Centigrades degrees has been selected for the phase 1;

the area, in the cooking chamber, where the heat sources to be used during the phase are located, where the possibility of selection is offered through option buttons, which can be actuated through the mouse and are associated to the upper area, the lower area, and the central-rear area, respectively; the example of the figure shows that the upper area and the lower area have been selected, to which specific heat sources are associated depending on the type of oven;

the type of ventilation to be possibly used during the phase, with the possibility of choosing between "slow, normal, fast"; in the example, the ventilation is not activated (the symbols of the option buttons are not blackened);

the mode of use of the grill, if desired, with the possibility of choosing between single and double power, always through option buttons which can be actuated by the mouse;

in the example, the double grill power has been selected.

It is clear that, in order to modify the operating parameters associated to the subsequent phases of the cycle (2, 3 and 4), the user only has to select the rectangle of interest in the zone III, with the consequent displaying of the modifiable parameters for that phase in the zone IV.

Once all settings/modifications have been executed for the various phases of interest., the user can then proceed with the storing of the new program (for instance, by using the option "Save as" in the zone 1), in the memory area ME3 of the control system of the oven.

It will be appreciated that, by means of the editor described above, the possibility is also offered for the user to suppress some of the phases into which the operating cycle of each program is subdivided, simply by setting its duration to a nil value.

At any rate, the editor program preferably provides for proper controls of the operations actuated by the user, in order to avoid wrong or improper programming, which could lead to unsatisfactory results or performances (such as, in the instance of a laundry wash machine, setting a "new" wash program for woolens at a temperature of the washing liquid of 90° C.).

From a practical standpoint, the present invention operates as follows.

In its initial standard version, the oven 1 has a basic intelligence of its own, being encoded in the memory areas ME1 and ME2, which allows the household appliance to execute some standard programs, such as a number of seven, which cannot be modified by the user.

In this situation, after switching the oven on through the switch 3 of the control panel 2, the display 6 shows the number and name and/or symbol of the first program being available in the memory area ME2; the user may then scroll sequentially the indications relating to the other six available programs on the display 6, by using the keys 5 (forward-backward).

Once the desired program has been reached, this can be started by pressing the key 7 (eventually, the user can modify the temperature value, if desired, actuating the selector 4). The oven 1 then perform the operating cycle relating to the program that has been chosen.

As it can be seen, therefore, the oven 1 operates in its basic version according to classic procedures.

Should the user desire to add new cooking programs to the oven 1, a Personal Computer 10 (with its programs editor installed) shall be used, which can be interfaced directly to the oven control system through a suitable cable connected to the standard serial line RS232, or through a proper "home bus".

In this way, the user can generate his own cooking program through the editor, being designed according to his specific requirements, as described above.

Once the new program has been edited, the user saves it in the memory area ME3 of the control system of the oven 1, according to the procedures previously described.

Eventually, the editor can be provided with options which allows for executing the new program on the oven 1 under the direct control of the Personal Computer 10, i.e. simply using the control system of the appliance as a executor of the commands of the Personal Computer (therefore, the oven 1 operates as a simple peripheral controlled by the PC itself); this, for instance, to allow the user to previously verify the efficiency of an operating cycle, before proceeding to a final storage of the relevant program in the memory, area ME3.

To this effect, the user may also decide to save a new program in the mass storage of the Personal Computer, instead of saving it directly in the control system of the oven 1; it has to be noticed, anyway, that the editor is so designed for suitably guiding the user during the various saving options and that, as said above, the parameters relating to the new program can be saved for an unlimited time, until a likely subsequent modification or cancellation by the user takes place.

Once the new program has been stored in the control system of the oven 1, the program can then be selected directly through the control panel 2 of the appliance, through the keys 5 and display 6.

Accordingly, if in the basic version of the oven 1 only the identifying data of the seven basic programs could be sequentially displayed on the display 6, now also those data relating to the new programs can be displayed, which the user may add up to a maximum number admitted by the capacity of the memory area ME3.

Thus, once the new programs have been stored in ME3, they can be selected and started in the classic mode, i.e. using the normal means provided to that purposes on the oven 1, without requiring the Personal Computer 10.

It is also clear that the user will be free to cancel the new programs residing in the area ME3 of the memory of the control system of the oven, or those available in the mass storage of the Personal Computer 00.

From the above description, it is clear how the basic version of the oven according to the present invention can perform all the conventionally known functions associated with it and how its cost is practically not affected with respect to a conventional mid-level household appliance with an electronic control.

The same household appliance, once interfaced with the Personal Computer and by means of the relevant editor, can be improved in a cost-effective way, with a lot of new programs, differing from the basic programs, whereby the user also has the possibility of:

- dynamically changing the configuration of the heating elements during the cooking process, which fact allows for achieving suitable temperature profiles relating to particular recipes;
- combining in an optimal way, in particular for the ovens having mixed cooking systems (such as infrared+ microwaves), the cooking aids provided by each one of said systems, so as the user has no need to plan specific sequences of manual operations;
- configuring at will the sequence of operation the actuators of the oven (lower heater, upper heater, rear heater, grill, fan, etc.), without any manual operation.

Finally, it has to be noticed that the present invention, even if described with particular reference to a cooking oven, is clearly applicable to any other household appliance equipped with an electronic control system.

Therefore, from the above description the features of the present invention are clear, as also clear are its advantages.

The main advantage of the present invention, which represents its most significant element, is to the benefit of the user and refers to the possibility of creating in a simple way new operating programs, even if having a complex structure, for their storage in the appliance control system.

A second advantage for the user lays in the fact that the latter has the possibility of initially purchasing the basic version of the appliance, and then add new programs at a later time, only if desired and with an extremely limited cost.

It is evident, in fact, that if the user already have a Personal Computer (as it is quite common nowadays), the cost required for "increasing" the capacity of the control system of the oven 1 are minimal, since only the interface module is required; moreover, considering that most household appliances having an electronic control are normally provided with an interface for communicating with the external world (for technical service purposes), it is clear that the enrichment of the oven 1 can practically take place at a zero cost.

It is obvious that many changes are possible for the man skilled in the art to the programming system described above by way of example, without departing from the novelty of the invention.

For instance, the possibility is cited of providing a specific customers' service, for supplying new programs to the appliance, or for creating new programs complying with; the user's specific requirements or wishes, should the user have no Personal Computer available in his/her home environment, or not wish to generate such programs directly.

In this case, an employed of said customers' service, will connect his own portable Personal Computer, having the editor described above, to the user's appliance for creating and/or adding the desired programs.

In a particularly advantageous embodiment of the present invention, the cited editor may be provided for allowing the user to download the new operating programs for the appliance from a remote systems, for their storing in the memory area Me3; obviously, such new programs can be stored in the control system of the oven 1 in their original form, or with modifications performed through the editor by the user himself.

To this purpose, and as represented in the example of FIG. 1, a standard telephone network RT can be used, through which the Personal Computer 10 equipped with a modem can perform a connection to a proper Internet site, where new programs for the appliance are made available, such as cooking programs for recipes prepared by famous cooks or, in the instance of a washing machine, programs specifically provided for the washing of specific type of laundry or crockery.

Also the system described above, using a remote connection, may be used according to two procedures:

- downloading and adding to the appliance control system a new program, to be locally activated, i.e. through the controls panel 2 of the oven 1;
- executing the program on the oven 1, but under the control of the Personal Computer 10, i.e. by-passing at least partially the appliance control system and using the latter as a simple peripheral.

It is clear that the above Internet site may be updated at regular intervals, with new recipes and relevant programs made available to the users of the household appliance, and it is also clear that the editor being present on the Personal Computer 10 may also be provided for the transmission to a remote address, through a telephone line, of files relating to programs created by the user (for example for a recipes exchange among various people).

In this situation, the editor will be provided to load in the memory of the Personal Computer 10 the programs contained in the memory area ME3 of the oven control system, and send them through the modem to other users, or to a special mailbox of the cited interned site.

Another possible embodiment concerns the type of displaying of the parameters on the editor, which in addition or as an alternative to the graphic form, may be in a tabular form, listing the modifiable parameters for the various phases.

According to another possible embodiment, the editor may be provided for allowing the displaying in real time, on the video of the Personal Computer 10 (for example in a graphic form) of suitable information relating to the operating status of the appliance, such as the parameters identifying the progress status of a performed program; for instance, always with reference to a cooking oven, such data may concern the current temperature, the heat sources being active, the time spent since the start of the cooking, the estimation of the time needed to reach the end of the cooking, the estimation of the food cooking level, likely indications for users should their manual action be required, diagnostic signals for technical assistance, etc.

Similarly, the editor may be provided for allowing to program in time the execution of an operating cycle of the appliance.

The information relating to the subdivision into various phases of the operative cycles of the appliance, as well as the information relating to the specific parameters of the phases of the basic or standard cycles, may reside in read-only memory means (ROM) or directly in the program memory of the microcontroller mp; however, it is clear on the other hand that the information relating to the parameters characterizing the phases of the basic or standard cycles may also be contained within protected areas of read-write memory means.

What is claimed is:

1. A system for programming a household appliance having an electronic control that manages the execution by the appliance of a plurality of programs consisting of treatment phases, the system including:

a microcontroller, a first memory associated with the microcontroller, the first memory storing as write protected during the manufacturing of the appliance first information that is used by the control system to execute a given number of first programs of the appliance, the first programs allowing the immediate use of the appliance after the completion of manufacturing;

a control panel residing on the appliance, the control panel including user-operated controls for the selection and the control of the execution of the first programs, communication means for interfacing the control system to an external electronic programming device, a writeable and erasable second memory resident on the appliance for storing second information provided by the external programming device, once the appliance has been marketed and/or installed at a user's premises, the second information allowing the control system to execute second programs which are in addition to and different from the first programs, the second programs being user-defined, and allowing the user to select and command the execution of the second programs through the control panel residing on the appliance, the second information being encoded and stored in the second memory for an undetermined time, until the user directs a subsequent modification or cancellation of the second information through the external programming device.

2. The system according to claim 1, further including a means for preventing the storage within the second memory of information which might lead to unsatisfactory results or performance of the appliance.

3. The system according to the claim 1, wherein the first information relates to the subdivision of the programs into various treatment phases and respective phases are characterized by determined values of control parameters of internal devices or actuators of the appliance.

4. The system according to claim 3, wherein at least a part the first information relates to the values of control parameters that characterize the various phases into which the first programs are subdivided.

5. The system according to claim 3, wherein at least a part of the second information relates to the values of the control parameters characterizing the various phases into which the second programs are subdivided.

6. The system according to claim 3, wherein the first and/or second information includes for a given phase the duration of the phase, a temperature value being characteristic of the phase, the configuration and/or the mode of operation for the internal devices or actuators of the appliance during the phase.

7. The system according to claim 1, wherein the second information comprises the respective second programs in which the user defines treatment phases, control parameters for the various phases or both.

8. The system according to claim 7, wherein the data identifying a given second program comprises an order number.

9. The system according to claim 7, wherein the data identifying a given second program comprises a name in alphabetical, numerical and/or graphic characters.

10. The system according to claim 7, wherein the data identifying a given second program comprises numerical information and alphabetical or alphanumerical information.

11. The system according to claim 1, wherein the first memory comprises at least a part of the program memory of the microcontroller.

12. The system according to claim 1, wherein the first memory comprises a memory of the ROM type.

13. The system according to claim 1, wherein the second memory comprises a memory of the EEPROM type.

14. The system according to claim 1, wherein the external programming device is a personal computer.

15. The system according to claim 1, wherein control system further includes means for executing the second programs under the direct control of the external programming device.

16. The system according to claim 1, wherein means are provided for using the control system of the appliance as an executor of controls coming from the external programming device, with the appliance behaving like a peripheral device connected to the external programming device.

17. The system according to claim 1, further including means for dynamically changing configuration of the values during execution of the respective second programs.

18. The system according to claim 1, wherein the external programming device displays operating status of the appliance during execution of the second programs.

19. A household appliance electronic control system, the control system comprising:

a microcontroller;

a first memory associated with the microcontroller, the first memory containing first information for use by the control system to execute a given number of first programs of the appliance, the first programs allowing the immediate use of the appliance once the manufacturing of the same has been completed, the first memory being write-protected for inhibiting the modification of the first information relating to the first programs, a second memory associated with the microcontroller, for storing second information once the appliance has been marketed and/or installed at a user's premises, the second information allowing the control system to execute second programs which are in addition to and different from the first programs, the second programs being user-defined, the second memory being writeable and erasable for allowing the storage, and/or the later modification of the second information relating to the second programs, a communication interface for connecting the control system to an external programming device, through which the second information is provided, a control panel residing on the appliance for the selection and the control of the execution of the first programs and the second programs.

20. The household appliance according to claim 19, wherein the appliance is a cooking oven.

21. The household appliance according to claim 19, wherein the appliance is a washing machine.

22. The household appliance according to claim 19, wherein the communication interface is a serial port.

23. The household appliance according claim 19, wherein the communication interface is an adapter for connecting the control system to a home bus.

24. The household appliance according claim 23, wherein the home bus is a power line carrier bus.

25. The household appliance according claim 19, wherein the control panel includes a display device.

26. The household appliance according to claim 25, wherein the control system provides for the sequential displaying on the display device of data identifying the second programs.

27. A method for programming a household appliance having an electronic control system that executes a plurality of programs, the method including the steps of:
storing first information within a first memory of the control system during the manufacturing stage of the appliance, the first information being used by the control system to control the execution of a given number of first programs of the appliance, the first programs allowing the immediate use of the appliance once the manufacturing of the same has been completed,
write protecting the first information to inhibit the modification of the first information after the information has have been stored in the first memory,
controlling at desired times the selection and the command of the execution of the first programs through a control panel on the appliance,
after the appliance has been marketed or installed at a user's premises, interfacing the control system to an external programming device;
obtaining, through the external programming device, second information for allowing the control system to execute second additional programs that differ from the first programs, the second programs being user-defined, the second information comprising data identifying the second additional programs;
storing the second information, in a writeable and erasable manner within a second memory of the control system;
controlling at desired times the selection and command of the execution of the second additional programs using the identifying data that is part of the second information;
selectively modifying or deleting the second information, as desired by the user.

28. The method according to claim 27, further including the step of dynamically changing configuration of the values during execution of the second programs.

29. The method according to claim 27, further including the step of displaying, on the external programming device, operating status of the appliance during execution of the second programs.

30. The method according to claim 29, further including the step of reading out the first and/or second information from the control system by means of the external programming device.

31. The method according to claim 30, further including the steps of
modifying, by means of the external programming device, the first information read out,
storing the relevant modified information within the second memory and pairing the modified information with data identifying the modified information as being associated with a given second additional program.

32. The method according to claim 29, further including the step of establishing a connection between the external programming device and a remote system.

33. The method according to claim 32, further including the step of downloading the second information from the remote system through the external programming device.

34. The method according to claim 32, wherein the remote system is an Internet site.

35. The method according to claim 32, further including the step of sending the second information to the remote system through the external programming device.

36. The method according to claim 27, further including the step of loading the second information contained in the second memory into a memory of the external programming device.

37. The method according to claim 27, wherein a user, through a user interface provided for the external programming device
displays data,
edits the second programs to subdivide a given program to be edited into various treatment phases and display the values of control parameters of internal devices or actuators of the appliance for each of the phases of the second programs, and
stores the second information relating to the edited second programs within the second memory.

38. The method according to claim 37, wherein the editing further comprises the displaying of the control parameters in a graphic form.

39. The method according to claim 37, wherein the editing further comprises entering and displaying data that identifies a selected program to be edited.

40. The method according to claim 37, wherein the editing further comprises the selection of a phase of interest among the phases into which a selected program to be edited is subdivided and displaying at least some of the control parameters relating to the selected phase.

41. The method according to claim 37, wherein the editing further comprises the generation and representation of a Cartesian plane showing, on the abscissa, the duration of the various phases forming the program to be edited, and on the ordinates, another parameter relating to the phases.

42. The method according to claim 41, wherein the another parameter relating to the phases is a temperature value.

43. The method according to claim 37, wherein the editing further comprises the suppression of at least one of the phases into which the program to be edited is subdivided.

44. The method according to claim 37, wherein the displaying depicts, in real time, data relating to the progress or status of a program being run on the appliance.

45. The method according to claim 37, wherein the program to be edited is a cooking program for an oven and the control parameters include:
the duration of a selected phase, and/or
the temperature to be reached within the oven during the selected phase, and/or
the configuration and/or operating mode of heat sources of the oven (1), and/or
the type of ventilation of possible use during the selected phase, and/or
the modes of a possible use of a grill heater during the selected phase.

* * * * *